US006594351B1

(12) United States Patent
Bhogal et al.

(10) Patent No.: US 6,594,351 B1
(45) Date of Patent: Jul. 15, 2003

(54) METHOD AND SYSTEM FOR AUTOMATED ADMINISTRATIVE ASSISTANCE FOR ASSOCIATED INTELLIGENT FAX PROCESSING

(75) Inventors: Kulvir Singh Bhogal, Austin, TX (US); Nizamudeen Ishmael, Jr., Austin, TX (US); Baljeet Singh Baweja, Austin, TX (US); Mandeep Sidhu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 09/704,572

(22) Filed: Nov. 3, 2000

(51) Int. Cl.$^7$ ............................................. H04M 11/00
(52) U.S. Cl. ........................... 379/100.01; 379/142.15; 379/100.09; 358/434
(58) Field of Search ....................... 379/100.06, 100.09, 379/100.13, 100.01, 142.01, 142.15; 358/401, 407, 434, 440, 443

(56) References Cited

U.S. PATENT DOCUMENTS

| | | | |
|---|---|---|---|
| 4,852,153 A | | 7/1989 | Streck ......................... 379/100 |
| 5,022,071 A | | 6/1991 | Mozer et al. .................. 379/93 |
| 5,033,079 A | | 7/1991 | Catron et al. ................ 379/100 |
| 5,146,489 A | | 9/1992 | Telibasa ....................... 379/100 |
| 5,287,199 A | * | 2/1994 | Zoccolillo ................... 358/402 |
| 5,499,287 A | | 3/1996 | Beck et al. .................... 379/67 |
| 5,651,055 A | | 7/1997 | Argade ......................... 379/88 |
| 5,666,210 A | * | 9/1997 | Yanai et al. ................. 358/402 |
| 5,805,679 A | | 9/1998 | Kuwabara .............. 379/100.15 |
| 5,870,458 A | | 2/1999 | Pappas et al. ............ 379/93.11 |
| 6,130,934 A | * | 10/2000 | Meek et al. ........... 379/100.09 |

FOREIGN PATENT DOCUMENTS

JP 11-252275 9/1999
WO WO 94/23526 10/1994

OTHER PUBLICATIONS

"Communications Enhancements Made Possible by Caller–ID", IBM Technical Disclosure Bulletin, v. 37, n. 10, pp. 27–30, Oct. 1994.

* cited by examiner

Primary Examiner—Stella Woo
(74) Attorney, Agent, or Firm—Jeffrey S. LaBaw; Joseph R. Burwell

(57) ABSTRACT

A method, a system, an apparatus, and a computer program product for automatically processing a facsimile document at a receiving device is presented. The receiving device stores a set of facsimile processing rules for automatically processing facsimile documents. The receiving device receives and stores a facsimile document and associated caller ID data from an originating device during a facsimile transmission. The receiving device then compares an originating phone number in the caller ID data against phone numbers in the set of facsimile processing rules. Each facsimile processing rule comprises one or more phone numbers and facsimile processing rule parameter data. In response to matching the originating phone number with a phone number in a facsimile processing rule, a modified facsimile document is then generated such that the modified facsimile document includes information associated with facsimile processing rule parameter data in the matching facsimile processing rule. The receiving device may then send the modified facsimile document via a facsimile transmission to a destination device at a phone number specified in the facsimile processing rule parameter data. The facsimile document can be modified by placing, in an identified empty region within the facsimile document, the information associated with facsimile processing rule parameter data in the matching facsimile processing rule.

36 Claims, 7 Drawing Sheets

282 — FROM: ACME CORP.   PHONE #: 512-555-9999   OCT 31 1999 13:45
         ⎵                  ⎵                      ⎵
         284                286                    288

XYZA CORPORATION
123 Main Street
NY, NY 99909
(512) 555-8888

280   CONTRACT

*Figure 2C*
(PRIOR ART)

294 — FROM: XYZA CORP.   PHONE #: 512-555-5678   OCT 31 1999 13:47
292 — FROM: ACME CORP.   PHONE #: 512-555-9999   OCT 31 1999 13:45

XYZA CORPORATION
123 Main Street
NY, NY 99909
(512) 555-8888

290   CONTRACT

*Figure 2D*
(PRIOR ART)

302 — FAX PROCESSING: RULE CREATION

ORIGINATING PHONE NUMBER:
512-555-1212 ▼

CLEAR
DELETE
SAVE
CANCEL

POST-RECEIPT FUNCTIONS
☒ PRINT      OPTIONS ...
☒ STORE      OPTIONS ...
☒ FORWARD    OPTIONS ...

NOTIFICATION OF INCOMING FAX
VOICEMAIL NUMBER  512-555-0202
E-MAIL ADDRESS    JSMITH@XYZA.COM

NAME OF EMPLOYEE FOR THIS FAX RULE
NAME              JOHN SMITH
VOICEMAIL NUMBER  512-555-0202
E-MAIL ADDRESS    JSMITH@XYZA.COM

300

304 — FAX TRAX OPTIONS  ◉ ON  ○ OFF } 306

INCOMING FAX INFORMATION
☒ CALLER ID ～ 308
☒ TIME ～ 310
☒ DATE ～ 312

TRAX RULE INFORMATION
☒ EMPLOYEE NAME ～ 314
☒ EMPLOYEE VOICEMAIL ～ 316
☒ EMPLOYEE E-MAIL ～ 318
☒ INCLUDE RULE DEFINITION ～ 320

TRAX LOCATION
○ MARGIN TRAX ～ 330
◉ PAGE TRAX ～ 332
  ☒ NEW PAGE ～ 334
  ○ FRONT ～ 336
  ◉ BACK ～ 338

MISCELLANEOUS TRAX OPTIONS
☒ FAX RECEIPT TO SENDER ～ 322
☒ LABEL AS COPY ～ 324
☒ TRAX TEXT: [Hold this for] ～ 326

*Figure 3*

```
602 ⌐ FROM: ACME CORP.   PHONE #: 512-555-9999      OCT 31 1999 13:45
604 ⌐ FROM: XYZA CORP.   PHONE #: 512-555-9999      OCT 31 1999 13:47

⎧ FAX TRAX FORWARDING TRAX RULE: 10/30/1999 COPY
606 ⎨   FROM: JOHN SMITH 512-555-0202 JSMITH@XYZA.COM
      ⎩ HOLD THIS FOR PICKUP BY JOHN SMITH AT 2 PM
```

XYZA CORPORATION
123 Main Street
NY, NY 99909
(512) 555-8888

600   CONTRACT

*Figure 6A*

```
612 ⌐ FROM: ACME CORP.   PHONE #: 512-555-9999      OCT 31 1999 13:45

⎧ FROM: XYZA CORP.
614 ⎨   PHONE #: 512-555-9999
      ⎩ OCT 31 1999 13:47
```

XYZA CORPORATION
123 Main Street
NY, NY 99909
(512) 555-8888

```
616 ⌐ FAX TRAX FORWARDING
618 ⌐ TRAX RULE: 10/30/1999
620 ──────── COPY
622 ⌐ FROM: JOHN SMITH
624 ──────── 512-555-0202
626 ──────── JSMITH@XYZA.COM
628 ⌐ HOLD THIS FOR PICKUP
      BY JOHN SMITH AT 2 PM
```

CONTRACT   610

*Figure 6B*

642 ⟶ FROM: XYZA CORP.   PHONE #: 512-555-9999 OCT 31 1999 13:45

644 { FAX TRAX FORWARDING TRAX RULE: 10/30/1999 COPY
FROM: JOHN SMITH 512-555-0202 JSMITH@XYZA.COM
HOLD THIS FOR PICKUP BY JOHN SMITH AT 2 PM

652 ⟶ FROM: XYZA CORP.   PHONE #: 512-555-9999 OCT 31 1999 13:45

654 { FAX TRAX FORWARDING TRAX RULE: 10/30/1999 COPY
FROM: JOHN SMITH 512-555-0202 JSMITH@XYZA.COM
HOLD THIS FOR PICKUP BY JOHN SMITH AT 2 PM

656 ⟶ FROM: ACME CORP.  PHONE #: 512-555-9999   OCT 31 1999 13:45

XYZA CORPORATION
123 Main Street
NY, NY 99909
658 ⟶ (512) 555-8888

CONTRACT

METHOD AND SYSTEM FOR AUTOMATED ADMINISTRATIVE ASSISTANCE FOR ASSOCIATED INTELLIGENT FAX PROCESSING

BACKGROUND OF THE INVENTION

1. Field of the Invention

The present invention relates to an improved data processing system and, in particular, to a method and apparatus for facsimile processing. Still more particularly, the present invention provides a method and apparatus for automated processing of facsimile documents.

2. Description of Related Art

The amount of digital communication has grown exponentially along with the growth of the Internet. While most Internet-based personal communication is in the form of electronic mail, or e-mail, new forms of digital communication continue to be developed. In addition, some types of communication that existed before the commercial use of the Internet have evolved into Web-based services. For example, electronic bulletin boards that once existed as stand-alone systems can now be found in Web-based newsgroups, and facsimiles can now be sent over the Internet in conjunction with or in place of dedicated telephone circuits. Other relatively new forms of communication, such as instant messaging and chat services, have also become quite common.

Each of these types of digital communication have their own characteristics that make one form of communication more desirable than another form of communication in a given circumstance. For example, newsgroups have the advantage of opening a discussion to a wide audience, possibly all Internet users. While an open newsgroup may draw a wider range of information in its posted responses, newsgroups have the disadvantage of not being private and of not having an implied time response period. In contrast, e-mail is relatively secure between two or more parties, and an implied etiquette allows one to assume that an e-mail message will be answered by a receiver of an e-mail message within a relatively short time period.

Facsimile documents, even when partially routed across the Internet, are relatively secure to the parties or organizations at the sending and receiving locations that are participating in a given communication session. Facsimile documents are also subject to an implied etiquette that allows one to assume that a facsimile document will be given attention by a receiving party within a relatively short time period.

While having similarities in an implied response period and an assumption of privacy, e-mail communication and facsimile communication vary in one's assumptions about the format or manner in which the receiving party should receive the transmitted information. One can send an e-mail message with attached files, but one cannot necessarily assume that the receiving party will print a hardcopy of an attached file or the e-mail message. In fact, a sending party may transmit a document as a softcopy e-mail attachment so that the receiving party can manipulate the softcopy of the document. In contrast, a fax is expected to be available in hardcopy format at its destination immediately, allowing a sending party to assume that the receiving party can immediately view a sheet of paper with an electronically reproduced image of the original document.

E-mail messages and facsimile documents are also subject to different types of receipt or post-receipt processing, i.e. processing while being received or after being received, and a sending party may have assumptions about the receipt or post-receipt processing to be applied to e-mail messages and facsimile messages. For example, the softcopy nature of an e-mail message allows a sender to assume that electronic copies of an e-mail message might be forwarded to parties other than the original receiver. In fact, most e-mail applications provide forwarding features, and, assuming that the e-mail headers are not stripped off the e-mail message during its routing, headers on an e-mail message can later be examined to determine the transmission route of a particular copy of an e-mail message.

Assuming that the receiving party has a simple facsimile machine, a facsimile document is typically printed as it is received. However, facsimile applications and systems have been developed that provide more sophisticated options for electronic receipt or post-receipt processing of facsimile documents. As a result, a sender increasingly cannot assume that a successful receipt of a facsimile transmission means that the document is immediately available in hardcopy format at its destination. In addition, by employing these additional facsimile features and services, a receiving party can create administrative burdens.

For example, facsimile documents can be stored as electronic softcopies upon receipt and/or forwarded to other facsimile machines or facsimile services either immediately or upon a programmed schedule. If a receiving party uses such features, then the receiving party must constantly be aware of the receipt or post-receipt processing options that have been invoked so that important faxes are not lost or misplaced. When multiple people have access to a facsimile machine, the potential for inappropriate receipt or post-receipt processing of a facsimile document is greatly increased.

With the increased ability to lose or misplace important facsimile documents, most organizations need automated assistance in handling their received facsimile documents when employing advanced facsimile receipt or post-receipt processing features. Most facsimile machines optionally add a line of text at the top of each image page to provide information about its origination, such as originating phone number, time, date, number of pages, and sending party. However, facsimile documents lack the electronic tracking features of e-mail messages, and although e-mail messages have certain advantages over facsimile documents, businesses will not soon become entirely paperless enterprises. People will continue to use facsimile transmissions, but with more complex facsimile features and services, there is a need for automated assistance with these advanced features.

Therefore, it would be advantageous to provide a method and system for automated administrative assistance associated with receipt or post-receipt processing of received facsimile documents. It would be particularly advantageous to provide a methodology for tracking and reporting the processing of received facsimile documents.

SUMMARY OF THE INVENTION

The present invention is a method, a system, an apparatus, or a computer program product for automatically processing a facsimile document at a receiving device. The receiving device stores a set of facsimile processing rules for automatically processing facsimile documents. The receiving device receives and stores a facsimile document and associated caller ID data from an originating device during a facsimile transmission. The receiving device then compares an originating phone number in the caller ID data against phone numbers in the set of facsimile processing rules. Each facsimile processing rule comprises one or more phone numbers and facsimile processing rule parameter data. In response to matching the originating phone number with a phone number in a facsimile processing rule, a modified facsimile document is then generated such that the modified facsimile document includes information associated with facsimile processing rule parameter data in the matching facsimile processing rule. The receiving device may then send the modified facsimile document via a facsimile transmission to a destination device at a phone number specified in the facsimile processing rule parameter data. The facsimile document can be modified by placing, in an identified empty region within the facsimile document, the information associated with facsimile processing rule parameter data in the matching facsimile processing rule.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIGS. 2C–2D show examples of typical facsimile documents with fax headers;

FIG. 3 shows a dialog box for creating processing rules in a fax application in accordance with a preferred embodiment of the present invention;

FIGS. 6A–6D show examples of facsimile documents with fax tracking information.

DETAILED DESCRIPTION OF THE INVENTION

Figure 1A:
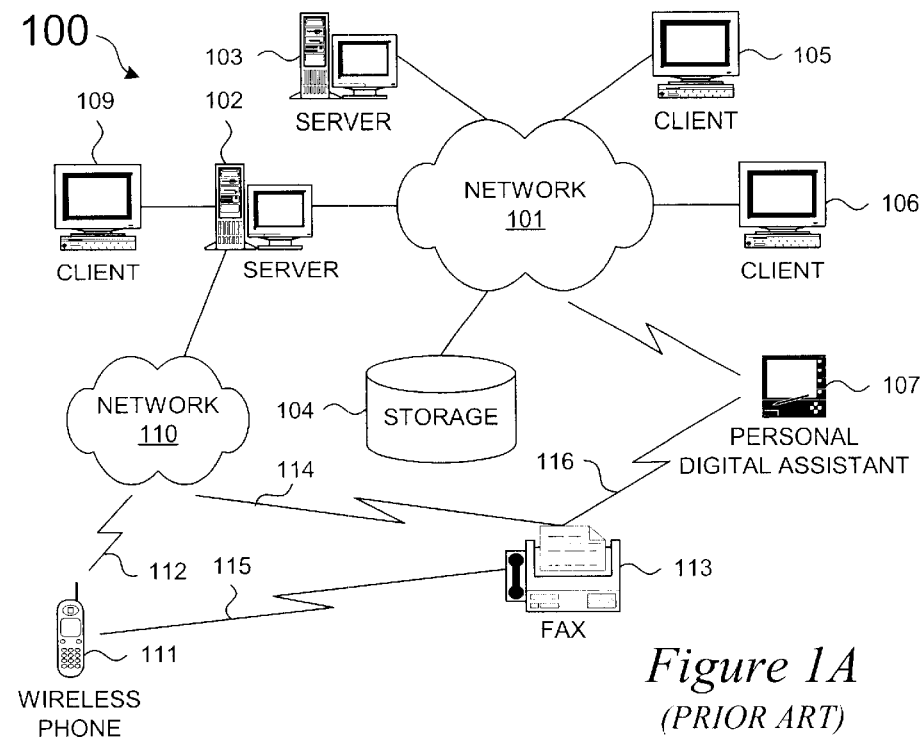
FIG. 1A depicts a typical distributed data processing system in which the present invention may be implemented.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 and servers 102–103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as LDAP, TCP/IP, HTTP, etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and fax machine 113 connects to network 110 through wireless link 114. Phone 111 and fax machine 113 can also directly transfer data between themselves across wireless link 115 using an appropriate technology, such as Bluetooth™ wireless technology, to create so-called personal area networks or personal ad-hoc networks. In a similar manner, fax machine 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
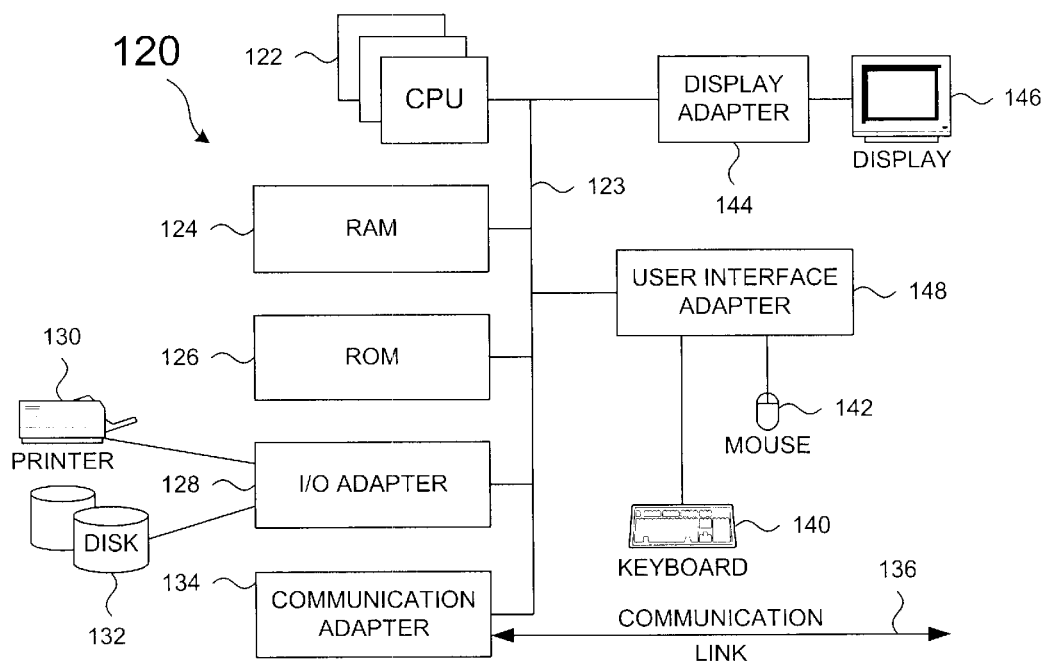
FIG. 1B depicts a typical computer architecture for a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a sound system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system be a typical facsimile machine or a personal computer. Other peripheral devices may be used in addition to or in place of the hardware depicted in FIG. 1B. In other words, one of ordinary skill in the art would not expect to find similar components or architectures within a network-enabled facsimile machine and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix™ operating system, while another device contains a simple Java™ runtime environment. A representative computer platform may include a browser, which is a well known software application for accessing hypertext documents in a variety of formats, such as image files, graphic files, word processing files, Extensible Markup Language (XML), Hypertext Markup Language (HTML), Handheld Device Markup Language (HDML); Wireless Markup Language (WML), and various other formats and types of files. Hence, it should be noted that the distributed data processing system shown in FIG. 1A is contemplated as being fully able to support a variety of peer-to-peer subnets and peer-to-peer services.

The present invention may be implemented on a variety of hardware and software platforms, as described above. More specifically, though, the present invention is directed to a method and system for providing automated administrative assistance associated with receipt or post-receipt processing of received facsimile documents.

A "receipt" is defined as an act or an instance of receiving or being received into one's possession. It should be noted that the following examples do make some distinctions between processing that occurs during the act of receiving a document and processing that occurs after the completion of the act of receiving a document. However, it is contemplated that the processing can occur in either manner such that the time periods can be considered to be substantially contemporaneous.

After a facsimile document is received, it may be electronically processed by storing it, forwarding it, or printing it. In addition, the processing may occur either immediately, according to a schedule, or according to user selected processing rules. The present invention provides a methodology for tracking and reporting the processing of facsimile documents. Before describing the present invention in more detail, though, some of the prior art concerning fax processing is presented.

Figure 2A:
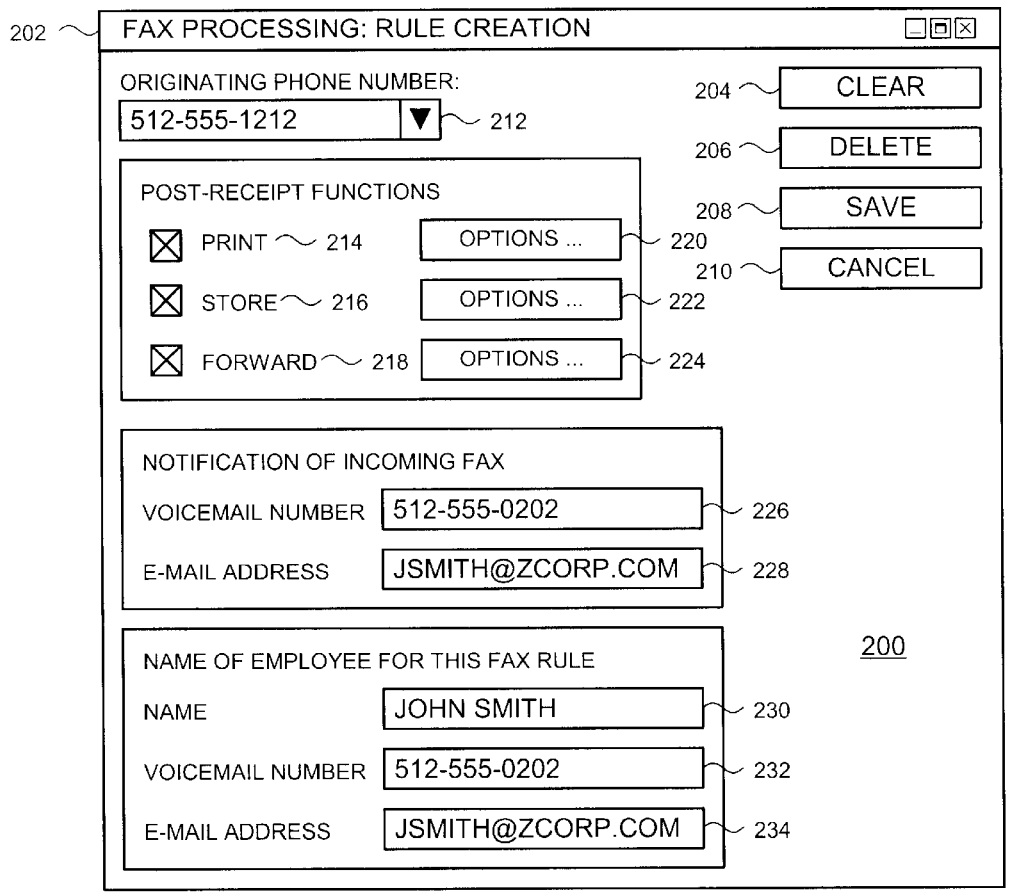
FIG. 2A shows a dialog box for creating processing rules in a typical fax application.

With reference now to FIG. 2A, a graphical representation of a dialog box for creating processing rules in a typical fax application is shown. A typical fax application may allow a user to create processing rules, which the fax application subsequently applies to incoming or received facsimile documents. These rules comprise user-specified parameters, which a fax application must receive and store in some manner.

Window 200 is a graphical user interface window that allows a user to create these rules and also provides input and output of information to the user concerning the previously created rules. Window 200 may be found within a dedicated application on a personal computer or workstation, but one of ordinary skill in the art would recognize that the features offered within window 200 could be incorporated in many different forms, such as an applet or plug-in within a browser application. One of ordinary skill in the art would also understand that the available features and the user interface for setting processing rules and parameters would also vary with the computing device that is being used for fax processing. For instance, a fax machine with an alphanumeric keypad and two-line text display may not have all of the features described below, and the input and output on such a device may be performed in a variety of well known manners that are tailored to the capabilities of the available user interface.

Window 200 contains title bar 202 that provides the name of the current application and/or the function being performed by the application. Buttons 204–210 allow a user to specify the overall action to be performed within window 200. Selecting "Clear" button 204 clears the parameters in window 200 in a manner similar to clearing all of the fields in an electronic form. Selecting "Delete" button 206 deletes the currently displayed rule; this button may be dimmed to show that the delete option is not available if a previously stored rule is not being displayed in window 200. Selecting "Save" button 208 stores the rule being displayed in window 200 into a rule database. Selecting "Cancel" button 210 cancels the current user action by closing window 200 without performing a save operation or modification operation of a current rule.

The processing rules to be applied against incoming or received facsimile documents may be organized in a variety of manners; window 200 shows an example in which the originating phone number of an incoming facsimile document is used as the classification parameter. Entry field or drop-down menu 212 allows a user to specify an incoming phone number to be associated with the processing rule.

Checkboxes 214–218 provide function selections that allow a user to specify the operations for the currently displayed processing rule; with the checkboxes, a user can specify multiple functions to be applied to the same received facsimile document. "Print" checkbox 214 allows a user to specify a schedule or other options for a received document to be printed. "Store" checkbox 216 allows a user to specify options concerning the storing of a document. "Forward" checkbox 218 allows a user to specify a schedule or other options for forwarding a received document to fax machines at other phone numbers. Available processing functions 214–218 may have associated options 220–224, respectively.

Option buttons 220–224 are not active until the user selects its corresponding function checkbox. After selecting an option button, a user may be presented with another dialog box or window that allows a user to view or modify parameters associated with the selected function. For printing options, a user can specify that a facsimile document should be printed: as it is received; after receiving the complete document; or on a schedule, e.g., it is only printed during business hours when someone is available to attend to the document. For storing options, a user can specify that a facsimile document should be stored: until printed; for a specified number of days; or until specifically deleted. For forwarding options, a user can specify that a facsimile document should be forwarded: immediately after receiving the complete document; on a schedule, e.g., it should be forwarded only during business hours when it can be assumed that a receiving party is available to attend to the document; to multiple locations; to a series of locations until the document is successfully forwarded and received at one of the locations.

Because of the implied assumption that a facsimile document requires immediate attention, some facsimile devices or services provide for an automatic, immediate notification when a facsimile document is received. Window 200 provides for a voicemail or telephone number 226 and/or an e-mail address 228 to which the fax application should send a notification message concerning the receipt of a facsimile document.

Window 200 also provides for the entry of employee (or other type of individual) information for the person who is entering the fax processing rule. This feature allows the fax application to track which persons are responsible for creating, modifying, or deleting a processing rule. In a large organization that allows multiple people to access and control a fax machine or application, this information can be essential for determining who is responsible for forwarding documents, etc. Entry fields 230–234 allow a user to specify a name, voicemail or telephone number, and e-mail address, respectively, at which to be notified.

Figure 2B:
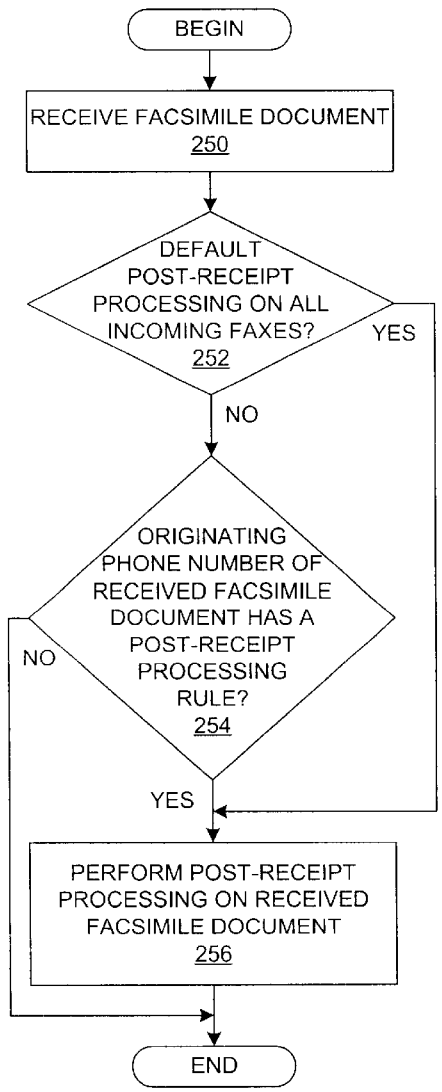
FIG. 2B depicts a flowchart with the basic processing steps for a typical intelligent fax processing application.

With reference now to FIG. 2B, a flowchart depicts the basic processing steps for a typical intelligent fax processing application. After a user has created, one or more processing rules and allowed the processing application to store the rules within a rule database, the processing application monitors a telephone or communication line and listens for incoming fax transmissions. After the fax application recognizes that a facsimile document is being received, it may immediately start processing the document or may wait until the entire document is received. In either case, the document is then subjected to receipt or post-receipt processing, as shown in FIG. 2B. For the sake of simplicity, the processing is shown after the entire document has been received.

The process begins when a facsimile document has been received (step 250). A determination is made as to whether some type of default processing is to be applied against all incoming documents as previously specified by one of the users of the fax machine or application (step 252). If so, then the process branches to perform the processing.

If not, then the originating phone number of the incoming facsimile document, as determined from the Caller ID information that was received and stored at the beginning of the transmission, is used to search the processing rule database to check whether or not there is a processing rule to be applied against this particular originating phone number (step 254). If not, then there is no further processing necessary for the document, although a default printing of the document might occur at this point in time, and the processing is then complete. If there is a processing rule for a phone number that matches the originating phone number, then the post-receipt processing is applied to the received document (step 256), which might include forwarding, etc., and the process is then complete.

Intelligent receipt or post-receipt processing of a facsimile document can be very useful for a fast-paced individual or organization. One can specify many different options to be applied against a received document. If someone is constantly moving between physical locations or has little time to watch for incoming documents, then one can program a fax application to maximize the chances that an incoming document receives prompt attention. In short, automatic, intelligent processing of a document can increase a person's or an organization's work performance and efficiency.

However, intelligent processing also increases the likelihood that a person or an organization will inject inefficiencies or confusion into administrative processes by using the automated processing.

For example, an employee might be expecting an important fax at the phone number of a fax machine in a main office, but the employee wants to drive from the main office across town to a branch office for a meeting later in the day. Without intelligent fax receipt or post-receipt processing, the employee would need to inform the sender to fax the document to a fax machine at the branch office or would need to have another employee at the main office forward the document by faxing it to the branch office after the document was received at the main office. The employee also might call the branch office to notify someone there to expect the important fax.

With intelligent fax processing, the administrative hassles of handling the incoming fax document can be automated. Since the employee might know the originating phone number for the incoming facsimile document, the employee can create a receipt processing rule so that the document is forwarded to a PDA with a backup operation of forwarding the document to a fax machine at the branch office.

Continuing with the example, the expected fax might arrive at the main office before the employee gets to the branch office, and the PDA might be turned off or otherwise unable to receive the fax when the fax machine or fax application at the main office attempts to forward the received document to the PDA. The backup operation is then attempted, which successfully faxes the important document to the branch office.

However, the employee may not have phoned the branch office to notify the branch office to hold the important document because the employee thought that he or she would arrive at the branch office before the document was received or that the PDA would receive the document. Because the forwarding and scheduling rules reside on a device in the main office, an employee at the branch office may not know why he or she received a fax directed to the other employee at the main office fax number, and administrative confusion may result. The employee at the branch office may think that the intended employee only works in the main office, or everyone at the branch office thinks that all faxes from this particular important client should only be received at the main office. In addition, if one document looks as if it were forwarded to the branch office, the employees at the branch office might expect all of the faxes received at the main office to be forwarded to the branch office and might be confused when only one fax is forwarded during the afternoon.

The branch office should not contact the sender because the sender would not have any knowledge of the forwarding of the document. If someone at the branch office calls the main office, the intended employee will not be there because the employee is still in transit to the branch office. The main office could lookup the forwarding rules for the original incoming phone number or search a fax log report to determine why the fax was forwarded, but this is burdensome and basically negates the advantages of setting up the forwarding process. Although everyone in the organization may know that the organization owns a system that can forward received facsimile documents, someone at the branch office may desire to know who is responsible for setting up a forwarding rule for this particular originating phone number.

If the fax application is a networked application, then someone at the branch office might be able to access the fax application through its network and view the processing rules. However, an application of this sort negates the need for forwarding received facsimile documents by re-faxing the document as the document could simply be viewed online from the branch office. In some cases, the organization may not have this type of networked application.

In another case, the intended employee may want to assume the technological "lowest common denominator". If the location to which the received document will be forwarded is a bank or some other location other than the branch office, then the intended employee may not have any special privileges, and the intended employee might desire to place the lowest possible administrative burden on that location. By assuming that the forwarded location has a simple fax machine, then the intended employee may want to attempt to ensure that the forwarded facsimile document is received yet put aside until he arrives to take possession of the document.

With reference now to FIGS. 2C–2D, examples of typical facsimile documents with fax headers are shown. In order to simplify the figures, only portions of documents are shown.

In the prior art, when a facsimile document is transmitted, most sending devices can modify the image of the document to add an informational line of text across to the top of the document so that the receiving party has some information about the sending party. FIG. 2C shows an example of a portion of a document with a single line of text added to an original document as may be received by an intended recipient. Document portion 280 contains a fax header as image line 282 showing the name 284 of the sending party, originating phone number 286, and time/date 288. FIG. 2D shows an example of a portion of a document that has been forwarding by re-faxing the document to another fax-enabled device. Document portion 290 contains two fax headers: image line 292, which is the original fax header; and image line 294, which is the newly added fax header for the forwarding operation.

The present invention recognizes that while it may be useful to have simple fax headers on a received facsimile document, the fax headers do not provide enough information concerning the fax operation that caused the recipient to receive the facsimile document. Moreover, when the facsimile document can be subjected to complex receipt or post-receipt processing, the possibility of confusion is greatly increased, as described above, and simple fax headers do not provide enough information concerning the processing that may have been applied against the facsimile document.

With reference now to FIG. 3, a graphical representation of a dialog box for creating processing rules in a fax application is shown in accordance with a preferred embodiment of the present invention. A typical fax application may allow a user to create facsimile processing rules, which the fax application subsequently applies to incoming or received facsimile documents. These facsimile processing rules comprise user-specified facsimile processing rule parameter data, which a fax application must receive from the user and then store in some manner. An example of a typical fax application is shown in FIG. 2A, as described above.

The present invention incorporates novel receipt or post-receipt processing features that facilitate administrative processing of a received facsimile document. As a result of receiving a facsimile document from an originating phone number that has one or more processing rules associated with the originating phone number, the present invention modifies the received facsimile document to include information associated with the receipt or post-receipt processing rule. FIG. 3 shows user-selectable options associated with the novel receipt or post-receipt processing features.

In a manner similar to that shown in window 200 of FIG. 2A, window 300 is a graphical user interface window that allows a user to create these rules and also provides input and output of information to the user concerning the previously created rules. Again, window 300 may be found within a dedicated application on a personal computer or workstation, and one of ordinary skill in the art would recognize that the features offered within window 300 could be incorporated in many different forms, such as an applet or plug-in within a browser application. One of ordinary skill in the art would also understand that the available features and the user interface for setting processing rules and parameters would also vary with the computing device that is being used for fax processing. For instance, a fax machine with an alphanumeric keypad and two-line text display may not have all of the features described below, and the input and output on such a device may be performed in a variety of well known manners that are tailored to the capabilities of the available user interface.

Window 300 contains title bar 302 that provides the name of the current application and/or the function being performed by the application. Window 300 also shows window region 304 containing user-selectable controls for choosing the types of processing options provided by the present invention. Each of these options either is associated with the inclusion of a type of information in the document modification or is associated with the location of the placement of the document modification within the received facsimile document. These options are termed "tracking" options because the result of using these options enables one to track the processing of a facsimile document over time by following the information in the document modifications that are placed within the original facsimile document. The manner in which the document is modified is explained in more detail further below.

Radio buttons 306 allow a user to specify whether or not the fax tracking features of the present invention should be used while performing receipt or post-receipt processing. If the "Off" radio button is selected, then all of the other fax tracking features may be dimmed to indicate that the features are not available for selection by the user. It should be noted that the selectable options may vary and may include greater, fewer, or different options.

Checkboxes 308–312 provide for the inclusion of data, such as Caller ID 308, device time 310, and device date 312, as determined by the act of receiving the incoming facsimile document. It should be noted that Caller ID data, which is well known in the art, is also known as Automatic Number Identification (ANI) data and may also include time and date data. While this information may be similar to some of the information in a fax header as included by the sending party, the two sets of information are not necessarily the same. The date and time of the receiving location may be different from the sending location, especially when they are located in different time zones. In fact, the received Caller ID information may be different from the name and phone number in the fax header because the fax header is manually input or programmed into the sending fax machine or fax application, whereas the Caller ID information is generated within the telephone system. In certain circumstances, it may be helpful to recognize differences between the two sets of information and, therefore, to include the Caller ID information in the fax tracking information.

Checkboxes 314–318 provide for the inclusion of information concerning the creation of the fax processing rule that caused the received facsimile document to be post-processed and modified. Each of the options, such as name 314, voicemail number 316, and e-mail address 318, are associated with the person who created the facsimile processing rule, and the inclusion of this information in the fax tracking image modification allows someone to quickly determine the person responsible for setting up the fax processing rule. Rule definition option 320 includes rule definition information in the fax tracking information, such as the date and/or time at which the rule was created, which may be useful for determining why the fax tracking options were set in a particular manner. It should be noted that other options concerning the fax tracking rule could be available to the user within this region of window 300.

Miscellaneous option checkboxes 322–326 allow a user to select other options, which are shown in other figures and described in more detail further below. "Fax receipt to sender" option 322 directs the fax machine or fax application to return a fax receipt to the original sender at the phone number determined from the incoming Caller ID information that was stored in association with the received facsimile document. The fax receipt provides an indication to the original sender of the receipt or post-receipt processing to which the original facsimile document has been subjected.

"Label as copy" option 324 ensures that the modified copy of the original facsimile document is labeled in some manner so that someone viewing a hardcopy of the document can determine whether or not the hardcopy is an original facsimile document or a copy of the original facsimile document.

"Trax text" option 326 enables a user to provide a text message that will be included in the facsimile image modification. For example, in addition to other fax tracking information, such as the name of the person who set the fax tracking option, the fax tracking information could include a message, such as "Hold this for pickup by John Smith at 2 pm". The text message may provide someone viewing the document with enough information to determine the reasons why the facsimile document appeared at the location.

Selectable options 330–338 provide for the specification of the location of the fax tracking information within the facsimile document. These locations are shown in other figures and described in more detail further below. "Margin trax" option 330 enables a user to specify that the fax tracking information should be located, if possible, within a margin region in the received facsimile document. "Page trax" option 332 enables a user to specify that the fax tracking information should be located within a region on a specially dedicated first page or last page of the received facsimile document. "New page" option 334 enables a user to specify that the fax application or fax machine should generate a new page or page break within the originally received facsimile document and then place the fax tracking information in a region within this newly generated page. Radio buttons 336–338 allow a user to specify a front location versus a back location in combination with the "page trax" option and "new page" option. If the "page trax" option is not selected, then the "new page", "front", and "back" options might be dimmed to show that these options are not available.

Figure 4:
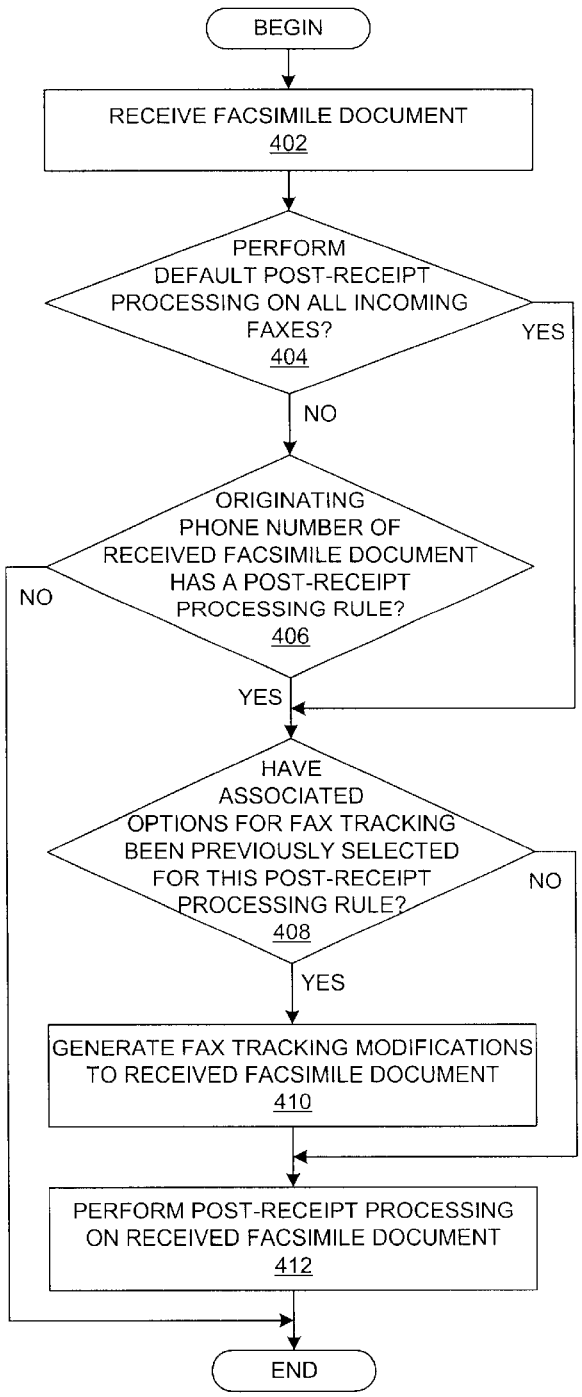
FIG. 4 depicts a flowchart with some of the processing steps for an intelligent fax processing application with automated administrative assistance as provided by a preferred embodiment of the present invention.

With reference now to FIG. 4, a flowchart depicts some of the processing steps for an intelligent fax processing application with automated administrative assistance as provided by a preferred embodiment of the present invention. In a manner similar to that described above with respect to FIG. 2B, after a user has created one or more processing rules and allowed the processing application to store the rules within a rule database, the processing application monitors a telephone or communication line and listens for incoming fax transmissions.

After the fax application recognizes that a facsimile document is being received, it may immediately start processing the document or may wait until the entire document is received. In either case, the document is then subjected to receipt or post-receipt processing, as shown in FIG. 4. For the sake of simplicity, the processing is shown after the entire document has been received. In contrast to the process shown in FIG. 2B, the present invention incorporates novel receipt or post-receipt processing features that facilitate administrative processing of a received facsimile document.

The process begins when a facsimile document has been received (step 402). A determination is made as to whether some type of default processing is to be applied against all incoming documents as previously specified by one of the users of the fax machine or application (step 404). If so, then the process branches to perform the other processing.

If not, then the originating phone number of the incoming facsimile document, as determined from the Caller ID information that was received and stored at the beginning of the transmission, is used to search the processing rule database to check whether or not there is a processing rule to be applied against this particular originating phone number (step 406). If not, then there is no further processing necessary for the document, although a default printing of the document might occur at this point in time, and the processing is then complete. Although the processing rules may be stored within a rule database such that a unique phone number is associated with a unique processing rule, it should be noted that the processing rules may be organized in a variety of manners, such as having a single processing rule associated with multiple phone numbers.

If there is a processing rule for a phone number that matches the originating phone number, then a determination is made as to whether or not the image of the originally received facsimile document should be modified to include fax tracking information as previously specified by a user (step 408), as provided by a preferred embodiment of the present invention. If not, then the process branches to continue processing according to the current rule. Otherwise, if fax tracking is associated with the current rule, then fax tracking modifications are generated and placed within the facsimile document (step 410). A fax tracking modification includes information associated with one or more data items from the matching processing rule. It should be noted that the image modifications may be generated on-the-fly during the encoding and transmission portions of the faxing process. The remainder of the selected post-receipt processing is performed on the received facsimile document (step 412), which might include forwarding, etc., and the process is then complete.

Figure 5:
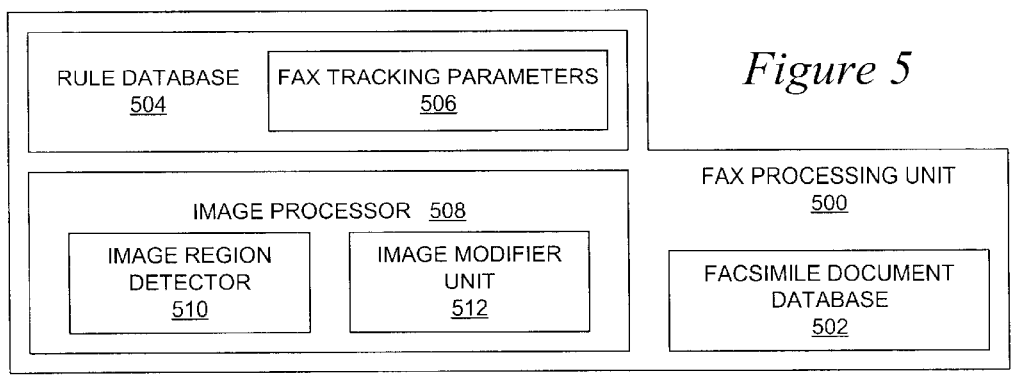
FIG. 5 depicts a block diagram with some of the components within a fax processing unit in accordance with a preferred embodiment of the present invention.

With reference now to FIG. 5, a block diagram depicts some of the components within a fax processing unit in accordance with a preferred embodiment of the present invention. Fax processing unit 500 receives and processes incoming and outgoing facsimile documents and may be included within a fax processing application, applet, or device. Facsimile documents are stored within facsimile document database 502 upon receipt and may be retrieved at some later time for processing according to previously user-specified schedules.

Rule database 504 stores user-created rules to be applied against incoming facsimile documents. Fax tracking options/parameters 506 may also be stored in association with the receipt or post-receipt processing rules.

When a processing rule with a fax tracking option is applied against a document, then image processor 508 is used to analyze the facsimile document image. Image region detector 510 is used to find blank, empty, or unused regions within the image so that the fax tracking information can be placed in appropriate locations within a document image, as is described in more detail further below. After an appropriate location on the document image is chosen, then image modifier unit 512 can be used to generate an image of the fax tracking information that can be placed within the document image in the chosen location.

With reference now to FIGS. 6A–6D, examples of facsimile documents with fax tracking information are shown. In order to simplify the figures, only portions of documents are shown.

In the prior art, when a facsimile document is transmitted, most sending devices can modify the image of the document to add an informational line of text across to the top of the document so that the receiving party has some information about the sending party. In contrast, the present invention modifies the image of the received facsimile document to include information associated with a receipt or post-receipt processing rule. The modified image contains fax tracking information and other types of associated information that facilitate physical handling and administrative processing of a hardcopy of a received facsimile document.

FIG. 6A shows an example of a portion of a document containing: a single line of text added to an original document as may have been received by an intended recipient; and fax tracking information added to the received facsimile document. In other words, document portion 600 shows the state of the document image after it has been forwarded by re-faxing the document to another fax-enabled device. Document portion 600 contains an image portion for fax header 602 showing the name of the sending party, an originating phone number, and the time and date of transmission. Fax header 604 is similar to fax header 602 except that fax header 604 has been added by a fax application or fax machine during the forwarding operation. In other words, fax header 602 was added during the first fax transmission, and fax header 604 was added during the second fax transmission. Hence, the addition of fax header 604 during the second fax transmission is merely the repetition of a well known fax header.

In accordance with the present invention, however, document portion 600 also shows fax tracking information 606 that has been added during the forwarding transmission. Various information items within the fax tracking information are derived from the receipt or post-receipt processing of the received facsimile document and from the rule that has been used to determine the processing parameters for the received facsimile document. In this instance, the fax tracking information has been placed in the top margin of the facsimile document.

In a manner similar to that shown in FIG. 6A, FIG. 6B shows an example of a portion of a document containing: a single line of text added to an original document as may have-been received by an intended recipient; and fax tracking information added to the received facsimile document. In other words, document portion 610 shows the state of the document image after it has been forwarded by re-faxing the document to another fax-enabled device. Document portion 610 contains an image portion of fax header 612 showing origination information. Fax header 614 is similar to fax header 612 except that fax header 614 has been added by a fax application or fax machine during the forwarding operation. Fax header 614 in FIG. 6B differs from fax header 604 in FIG. 6A merely in location: fax header 614 is located within the left margin in response to a user selection of an option for placing fax headers and/or fax tracking information within available margin space.

Again, in a manner similar to that shown in FIG. 6A, document portion 610 in FIG. 6B also shows fax tracking information items 616–628 that have been added during the forwarding transmission. Label 616 shows the type of fax processing rule that has caused the facsimile document to be transmitted again. Rule information 618 shows the date on which the fax processing rule was created. "COPY" indication 620 alerts someone viewing the physical document that it should be treated as a copy of the received facsimile document and not as the "original" facsimile document for subsequent processing. In other words, administrative processing indications or demarcations, such as "COPY", "ORIGINAL", "FORWARDED COPY", "FILING COPY", etc., can be used to control which documents the receiving party desires to treat as "official" facsimiles, perhaps for filing with other records, and which documents the receiving party desires to treat as "working copies" that may be discarded when no longer needed.

Name 622, voicemail number 624, and e-mail address 626 provide information about the person responsible for setting up the fax processing rule. Fax tracking message 628 allows the responsible party to include a message that may provide helpful information to someone handling the document. In other words, the text message may provide someone viewing the document with enough information to determine the reasons why the facsimile document appeared at the location.

Fax tracking information items 616–628 in FIG. 6B differ from fax tracking information 606 in FIG. 6A merely in location: fax tracking information items 616–628 are located within the left margin in response to a user selection of an option for placing fax headers and/or fax tracking information within available margin space.

The most appropriate margin space within a document image can be selected by an image analysis unit within the fax device or fax application such that the fax tracking information is not placed in a location that overwrites other text or other information within the document image. Moreover, if another fax application or fax device subsequently makes a determination to perform some type of receipt or post-receipt fax processing on the facsimile document, the facsimile document can be modified again, and the fax tracking information is placed into the most appropriate blank region in the document image.

FIG. 6C shows an example of a portion of a document containing fax tracking information added to the received facsimile document. In this case, document portion 640 shows the state of the document image after it has been forwarded by re-faxing the document to another fax-enabled device. More particularly, the fax application or fax device has appended a blank page to the facsimile document, and the fax tracking information has been added to the image for the blank page. Document portion 640 contains an image portion for fax header 642 showing origination information and an image portion for fax tracking information 644. Again, if another fax application or fax device subsequently re-faxes the facsimile document, the facsimile document can be modified again, and the fax tracking information can be placed below the first set of fax tracking information.

FIG. 6D shows an example of a portion of a document containing fax tracking information. In this case, document portion 650 shows a document image that has been generated as a fax receipt to provide a record that the fax was forwarded or otherwise processed. Document portion 650 contains an image portion for fax header 652 showing origination information and an image portion for fax tracking information 654. The document image also contains miniaturized image 658, which is an image of the first page of the originally received document, as can be seen by the inclusion of fax header 656 that was placed on the document image during the first fax transmission of the document. The destination phone number for the fax receipt can be specified by a user as a parameter within the receipt or post-receipt processing rule. The fax receipt may be useful for notifying someone, via the facsimile image, what additional processing has been performed on the originally received document. For example, in certain circumstances, the original sender may need to be provided with proof of facsimile transmission according to an agreement between the parties. In that case, the fax receipt not only notifies the sending party that the document was successfully received but also that the document was subsequently processed in some manner.

The advantages of the present invention should be apparent in view of the detailed description of the invention that is provided above. In the prior art, a facsimile document can be modified with a fax header containing origination information. In the present invention, a received facsimile document can be modified with fax tracking information that is embedded within the document. The fax tracking information contains information pertaining to a processing rule that has been applied to a received facsimile document. By including the fax tracking information on the document image, someone that is viewing the facsimile document can see what type of receipt or post-receipt processing has been applied to the facsimile document, thereby allowing that person to understand what other administrative actions might be necessary for the facsimile document. The inclusion of the fax tracking information reduces administrative errors and inefficiencies in handling hardcopies of facsimile documents.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing a facsimile document at a receiving device, wherein the receiving device stores a set of facsimile processing rules for automatically processing facsimile documents, the method comprising the steps of:

storing a facsimile document and associated caller identification (ID) data received from an originating device during a facsimile transmission;

comparing an originating phone number in the caller ID data against phone numbers in the set of facsimile processing rules, wherein a facsimile processing rule comprises one or more phone numbers and facsimile processing rule parameter data; and in response to matching the originating phone number with a phone number in a facsimile processing rule, generating a modified facsimile document that includes information associated with facsimile processing rule parameter data in the matching facsimile processing rule.

2. The method of claim 1 further comprising:

processing the modified facsimile document according to the matched facsimile processing rule.

3. The method of claim 2 further comprising:

sending the modified facsimile document via a facsimile transmission to a destination device at a phone number specified in the facsimile processing rule parameter data.

4. The method of claim 1 further comprising:

identifying an empty region within the facsimile document; and modifying the facsimile document by placing, in the identified empty region within the facsimile document, the information associated with facsimile processing rule parameter data in the matching facsimile processing rule.

5. The method of claim 4 further comprising:

determining a type of document region to be identified as an empty region according to a user-specified parameter in the facsimile processing rule parameter data in the matching facsimile processing rule.

6. The method of claim 4 further comprising:

generating a new page in the modified facsimile document according to a user-specified parameter in the facsimile processing rule parameter data in the matching facsimile processing rule.

7. The method of claim 4 wherein the facsimile processing rule parameter data includes a name associated with a user who created the matching facsimile processing rule.

8. The method of claim 4 wherein the facsimile processing rule parameter data includes a phone number associated with a user who created the matching facsimile processing rule.

9. The method of claim 4 wherein the facsimile processing rule parameter data includes a facsimile processing rule type identifier.

10. The method of claim 4 wherein the facsimile processing rule parameter data includes a creation date and/or a creation time of the matching facsimile processing rule.

11. The method of claim 4 wherein the facsimile processing rule parameter data includes user-specified message text.

12. The method of claim 4 wherein the facsimile processing rule parameter data includes administrative demarcations.

13. The method of claim 1 further comprising:

modifying the facsimile document by placing, in the identified empty region within the facsimile document, information associated with an act of receiving the facsimile document.

14. The method of claim 13 wherein the information associated with an act of receiving the facsimile document comprises information associated with caller ID data.

15. The method of claim 1 further comprising:

generating a fax receipt document that includes a reduced reproduction of the facsimile document and information associated with facsimile processing rule parameter data in the matching facsimile processing rule.

16. The method of claim 15 further comprising:

sending the fax receipt document to the originating device via a facsimile transmission.

17. An apparatus for processing a facsimile document, wherein the apparatus stores a set of facsimile processing rules for automatically processing facsimile documents, the apparatus comprising:

storing means for storing a facsimile document and associated caller identification (ID) data received from an originating device during a facsimile transmission;

comparing means for comparing an originating phone number in the caller ID data against phone numbers in the set of facsimile processing rules, wherein a facsimile processing rule comprises one or more phone numbers and facsimile processing rule parameter data; and first generating means for generating, in response to matching the originating phone number with a phone number in a facsimile processing rule, a modified facsimile document that includes information associated with facsimile processing rule parameter data in the matching facsimile processing rule.

18. The apparatus of claim 17 further comprising:

processing means for processing the modified facsimile document according to the matched facsimile processing rule.

19. The apparatus of claim 18 further comprising:

first sending means for sending the modified facsimile document via a facsimile transmission to a destination device at a phone number specified in the facsimile processing rule parameter data.

20. The apparatus of claim 17 further comprising:

identifying means for identifying an empty region within the facsimile document; and first modifying means for modifying the facsimile document by placing, in the identified empty region within the facsimile document, the information associated with facsimile processing rule parameter data in the matching facsimile processing rule.

21. The apparatus of claim 20 further comprising:

determining means for determining a type of document region to be identified as an empty region according to a user-specified parameter in the facsimile processing rule parameter data in the matching facsimile processing rule.

22. The apparatus of claim 20 further comprising:

second generating means for generating a new page in the modified facsimile document according to a user-specified parameter in the facsimile processing rule parameter data in the matching facsimile processing rule.

23. The apparatus of claim 20 wherein the facsimile processing rule parameter data includes a name associated with a user who created the matching facsimile processing rule.

24. The apparatus of claim 20 wherein the facsimile processing rule parameter data includes a phone number associated with a user who created the matching facsimile processing rule.

25. The apparatus of claim 20 wherein the facsimile processing rule parameter data includes a facsimile processing rule type identifier.

26. The apparatus of claim 20 wherein the facsimile processing rule parameter data includes a creation date and/or a creation time of the matching facsimile processing rule.

27. The apparatus of claim 20 wherein the facsimile processing rule parameter data includes user-specified message text.

28. The apparatus of claim 20 wherein the facsimile processing rule parameter data includes administrative demarcations.

29. The apparatus of claim 17 further comprising:

second modifying means for modifying the facsimile document by placing, in the identified empty region within the facsimile document, information associated with an act of receiving the facsimile document.

30. The apparatus of claim 29 wherein the information associated with an act of receiving the facsimile document comprises information associated with caller ID data.

31. The apparatus of claim 17 further comprising:

third generating means for generating a fax receipt document that includes a reduced reproduction of the facsimile document and information associated with facsimile processing rule parameter data in the matching facsimile processing rule.

32. The apparatus of claim 31 further comprising:

second sending means for sending the fax receipt document to the originating device via a facsimile transmission.

33. A computer program product on a computer readable medium for use in a data processing system for processing a facsimile document, wherein the data processing system stores a set of facsimile processing rules for automatically processing facsimile documents, the computer program product comprising:

instructions for storing a facsimile document and associated caller identification (ID) data received from an originating device during a facsimile transmission;

instructions for comparing an originating phone number in the caller ID data against phone numbers in the set of facsimile processing rules, wherein a facsimile processing rule comprises one or more phone numbers and facsimile processing rule parameter data; and instructions for generating, in response to matching the originating phone number with a phone number in a facsimile processing rule, a modified facsimile document that includes information associated with facsimile processing rule parameter data in the matching facsimile processing rule.

34. The computer program product of claim 33 further comprising:

instructions for sending the modified facsimile document via a facsimile transmission to a destination device at a phone number specified in the facsimile processing rule parameter data.

35. The computer program product of claim 33 further comprising:

instructions for identifying an empty region within the facsimile document; and instructions for modifying the facsimile document by placing, in the identified empty region within the facsimile document, the information associated with facsimile processing rule parameter data in the matching facsimile processing rule.

36. The computer program product of claim 33 further comprising:

instructions for generating a fax receipt document that includes a reduced reproduction of the facsimile document and information associated with facsimile processing rule parameter data in the matching facsimile processing rule.

* * * * *